US012314902B2

United States Patent
Hambrick et al.

(10) Patent No.: US 12,314,902 B2
(45) Date of Patent: May 27, 2025

(54) SEMI-AUTOMATED FORM-BASED CHAT

(71) Applicant: MH Sub I, LLC, El Segundo, CA (US)

(72) Inventors: Martin Alexander Hambrick, Round Rock, TX (US); Aaron John Dillon, Pflugerville, TX (US); Hitee Chandra Jha, Fountain Valley, CA (US)

(73) Assignee: MH SUB I, LLC, El Segundo, CA (US)

( * ) Notice: Subject to any disclaimer, the term of this patent is extended or adjusted under 35 U.S.C. 154(b) by 172 days.

(21) Appl. No.: 15/360,748

(22) Filed: Nov. 23, 2016

(65) Prior Publication Data
US 2018/0143973 A1    May 24, 2018

(51) Int. Cl.
| | | |
|---|---|---|
| *G06Q 10/10* | (2023.01) | |
| *H04L 51/046* | (2022.01) | |
| *H04L 51/18* | (2022.01) | |
| *H04L 67/02* | (2022.01) | |
| *H04L 67/14* | (2022.01) | |
| *H04L 67/141* | (2022.01) | |
| *H04L 67/50* | (2022.01) | |

(52) U.S. Cl.
CPC ........... *G06Q 10/10* (2013.01); *H04L 51/046* (2013.01); *H04L 51/18* (2013.01); *H04L 67/02* (2013.01); *H04L 67/14* (2013.01); *H04L 67/141* (2013.01); *H04L 67/535* (2022.05)

(58) Field of Classification Search
CPC ..... G06Q 10/10; G06F 3/0482; G06F 3/0484; G06F 17/2809; H04L 51/046; H04L 51/18; H04L 67/02; H04L 67/141

USPC .......................................................... 715/752
See application file for complete search history.

(56) References Cited

U.S. PATENT DOCUMENTS

| | | | | |
|---|---|---|---|---|
| 6,167,523 A | * | 12/2000 | Strong | G06F 40/174 726/21 |
| 7,603,413 B1 | * | 10/2009 | Herold | G06Q 10/10 709/204 |
| 8,738,739 B2 | * | 5/2014 | Makar | G06Q 30/0269 709/219 |

(Continued)

OTHER PUBLICATIONS

CA 2949890 filed Nov. 29, 2016 Office Action dated Jan. 11, 2023.
(Continued)

*Primary Examiner* — William L Bashore
*Assistant Examiner* — Koorosh Nehchiri
(74) *Attorney, Agent, or Firm* — Rutan & Tucker, LLP (57) ABSTRACT

A chat communication session is established between a first and second network device. Displayable content is generated during the chat communication session for transmission by the first network device, where the displayable content includes (i) a first chat question, (ii) a first set of interactive responses to the first chat question, and (iii) a first text field. The displayable content is transmitting by the first network device to the second network device. In response to selection of one of the first set of interactive responses at the second network device, at least a second chat question is generated along with a second set of interactive responses to the second chat question is generated for transmission. However, responsive to detecting text entry within the first text field, the first network device is configured to provide an operator with access to the chat communication session for response to the text entry.

21 Claims, 6 Drawing Sheets

(56) References Cited

U.S. PATENT DOCUMENTS

| | | | | |
|---|---|---|---|---|
| 8,817,968 | B1* | 8/2014 | Boutcher | H04W 4/14 379/265.09 |
| 9,386,152 | B2* | 7/2016 | Riahi | H04M 3/5183 |
| 9,866,693 | B2* | 1/2018 | Tamblyn | H04M 15/8228 |
| 10,848,445 | B1* | 11/2020 | Willmann | H04L 51/32 |
| 2004/0054693 | A1* | 3/2004 | Bhatnagar | G06Q 10/107 |
| 2004/0083267 | A1* | 4/2004 | Thompson | H04L 67/34 709/206 |
| 2007/0043878 | A1* | 2/2007 | Carlson | H04L 51/066 709/246 |
| 2007/0174390 | A1* | 7/2007 | Silvain | G06Q 10/10 709/204 |
| 2008/0021288 | A1* | 1/2008 | Bowman | H04L 67/18 600/300 |
| 2009/0245500 | A1* | 10/2009 | Wampler | H04M 7/006 379/265.09 |
| 2011/0125734 | A1* | 5/2011 | Duboue | G09B 7/00 707/723 |
| 2012/0030301 | A1* | 2/2012 | Herold | H04L 51/04 709/206 |
| 2012/0150973 | A1* | 6/2012 | Barak | G06Q 30/0609 709/206 |
| 2013/0326375 | A1* | 12/2013 | Barak | G06Q 30/0201 715/758 |
| 2014/0074454 | A1* | 3/2014 | Brown | G06F 3/167 704/9 |
| 2014/0108583 | A1* | 4/2014 | Kulkarni | H04L 51/046 709/206 |
| 2014/0119531 | A1* | 5/2014 | Tuchman | H04M 7/003 379/265.09 |
| 2014/0122109 | A1* | 5/2014 | Ghanbari | G16H 50/20 705/2 |
| 2014/0122407 | A1* | 5/2014 | Duan | G06N 5/02 706/50 |
| 2014/0259009 | A1* | 9/2014 | Bhattiprolu | G06F 8/61 717/174 |
| 2014/0310005 | A1* | 10/2014 | Brown | G06F 40/232 704/275 |
| 2015/0100381 | A1* | 4/2015 | Petrie | G06Q 30/0241 705/7.32 |
| 2015/0248886 | A1* | 9/2015 | Sarikaya | G10L 15/22 704/257 |
| 2015/0324903 | A1* | 11/2015 | Starikova | G06Q 40/02 705/35 |
| 2015/0350443 | A1* | 12/2015 | Kumar | G06F 3/04842 379/265.13 |
| 2016/0099892 | A1* | 4/2016 | Palakovich | H04L 51/04 709/206 |
| 2016/0275582 | A1 | 9/2016 | Zuverink et al. | |
| 2017/0026318 | A1* | 1/2017 | Daniel | H04L 51/046 |
| 2017/0048170 | A1* | 2/2017 | Smullen | H04L 67/02 |
| 2017/0180276 | A1* | 6/2017 | Gershony | H04L 51/02 |
| 2017/0180284 | A1* | 6/2017 | Smullen | H04L 69/14 |
| 2017/0279747 | A1* | 9/2017 | Melzer | H04L 51/046 |
| 2017/0324866 | A1* | 11/2017 | Segre | H04L 51/046 |
| 2018/0007204 | A1* | 1/2018 | Klein | H04M 3/5191 |
| 2018/0053119 | A1* | 2/2018 | Zeng | G06N 20/00 |
| 2018/0054523 | A1* | 2/2018 | Zhang | H04M 3/5166 |
| 2018/0083898 | A1* | 3/2018 | Pham | H04L 51/046 |
| 2018/0131645 | A1* | 5/2018 | Magliozzi | G06F 40/30 |
| 2018/0152411 | A1* | 5/2018 | Lee | G06Q 10/107 |
| 2018/0212904 | A1* | 7/2018 | Smullen | H04L 51/02 |

OTHER PUBLICATIONS

CA 2949890 filed Nov. 29, 2016 Office Action dated Nov. 29, 2023.

* cited by examiner

SEMI-AUTOMATED FORM-BASED CHAT

FIELD

Embodiments of the disclosure relate to the field of communications. More specifically, one embodiment of the disclosure relates to a scriptable, automated chat engine offering both interactive responses by a chat participant for structured data entry and an ability for the chat participant to interact in a free-form manner with a human operator.

GENERAL BACKGROUND

Over the last decade or so, networked communications have become a necessary tool for businesses to attract customers. Typically, companies develop websites that provide online visitors with access to information concerning available products and/or services. Over the last few years, however, many websites have been customized to offer real-time communication capabilities that allow online visitors to obtain answers to specific inquiries. This real-time communication capability is referred to as a "web chat service".

A web chat service provide online visitors with an ability to communicate with a human operator who is responsible for handling real-time inquiries associated with a particular website via a web browser. Typically, during operation, a web chat service generates a chat window, which facilitates text-based communications between an online visitor and the human operator who is responsible for handling queries from the online visitor and gathering information concerning the online visitor. The gathered information may be used for subsequent communications with that online visitor. While the web chat service may benefit online visitors by providing him or her with specific information to make informed purchasing decisions, it also introduces a number of logistical problems.

For example, deploying a web chat service with human operators who are required to type every question and subsequent responses is cost prohibitive for high-traffic websites having tens of thousands of online visitors daily. To support a web chat service for a high-traffic website, a large group of human operators would be needed to ensure that the online visitors are not experiencing unacceptable delays, which would adversely affect the web chat service's ability to convert online visitors into consumers. Furthermore, the parsing of free-flow chat information by a human operator is not only time intensive (costly) but is also difficult to perform accurately on a consistent basis. As a result, due to prolonged delays and parsing errors caused by human operators, the opportunity to secure requisite information from online visitor may be lost occasionally.

In lieu of web chat services relying on human operators, chat bots have been used to automate chat-based communications between an online visitor and the chat bot. As the chat bots are fully automated, they offer no capabilities for contacting human operators. This has caused issues, especially when the chat bot is misinterpreting incoming communications, and thus, becomes extremely ineffective in its goal to provide a better user navigation experience and ultimately converting an online visitor into a business customer.

BRIEF DESCRIPTION OF THE DRAWINGS

Embodiments of the disclosure are illustrated by way of example and not by way of limitation in the figures of the accompanying drawings, in which like references indicate similar elements and in which.

DETAILED DESCRIPTION

Embodiments of the disclosure are directed to a semi-automated chat service provided by chat management logic and chat assistance logic of a network device. In general, the chat management logic controls formation of a chat communication session while the chat assistance logic controls communications associated the semi-automated chat service by the network device during the chat communication session. Collectively, these logic units provide an automated chat service, while at the same time, provide access to operator-based chat communications to handle certain instances where operator interaction is requested or essential in response to text entry interpretation failures. These device-controlled communications are configured to improve accuracy in data collection by the network device while, at the same time, decrease the total amount of time typically need for such data collection. The data collection may be directed to a gathering of data to complete an online, interactive form that is specific to a particular service or product provider (e.g., financial service provider, legal service provider, vehicle dealer, etc.) or a particular industry (e.g., loan procurement, legal referral, vehicle purchase or lease, etc.). The data may be subsequently transmitted to a service or product provider in a format selected by that provider.

More specifically, the chat assistance logic features a scriptable, automated chat engine that controls communications with a targeted network device after a chat communication session has been established by the chat management logic. According to one embodiment of the disclosure, the automated chat engine operates in accordance with one or more scripts, where each script includes a plurality of rules that may be tailored for a particular provider. Upon processing these rules, the automated chat engine iteratively generates, for display at the targeted network device, a chat question followed by a set (one or more) of possible answers associated with that question until a threshold amount of data has been collected (e.g., at least a predetermined number of chat questions have been directly answered through interactive responses or indirectly answers by an operator auto-selecting of the corresponding interactive response). The selection of a particular script may be determined by parsing information included in a chat acceptance message and interpreting which provider (or industry) the chat communication session pertains.

According to one embodiment of the disclosure, a script includes an array of objects that collectively formulate a decision tree having multiple chat execution paths. Each object of the script includes (i) one or more alphanumeric characters, symbols or images that are used to formulate a text question to a chat participant (hereinafter "chat question"); (ii) one or more interactive responses each corresponding to a possible, predetermined answer to the chat question; and (iii) a behavior that identifies a next segment of the script to be executed upon transmission of the chat question and corresponding interactive responses during the chat communication session. Herein, the interactive responses may include one or more selectable response elements (e.g., one or more selectable standardized inputs such as selectable display buttons, drop-down menus, etc.) and/or one or more text boxes. The one or more text boxes prompt the chat participant to enter requested information as an answer to a particular chat question. The chat question and corresponding interactive responses enable structured online data entry and retrieval. The script may be provided as a JavaScript Object Notation (JSON) object for example.

As described above, each script is configured to control operations of the chat engine to generate a plurality of chat questions and their corresponding interactive responses, where information provided with each interactive response corresponds to an answer associated with an online, interactive form represented by that script. When selectable response elements are provided for use by the chat participant, the selected response element is highlighted and remains in the chat window to allow the chat participant to recall her or his answers and correct any errors, as necessary. Especially on mobile devices where text entry is challenging, the chat assistance logic offers one-touch options that increase the speed at which an online interactive form can be completed (decrease response time) and reduces overall costs for handling online product or service inquiries through increased accuracy in data capture.

In addition to providing selectable response elements, the chat engine may generate one or more text fields (generally referred to as "text field") to accompany the interactive responses and the corresponding chat question. The text field allows the chat participant to conduct free-form text communications with a secondary, automated chat service is that not directed to gathering personal identifiable information associated with the chat participant or with a "live" (human) operator.

In addition to the chat engine, the chat assistance logic may further include data validation logic to confirm that the answers set forth in the text box are compliant with the type of information requested. Additionally, the chat assistance logic may further include chat monitoring logic that attempts to interpret the free-form text entered into the text field and auto-select a particular interactive response corresponding to the interpreted text. Where the chat monitoring logic is unable to interpret the free-form text entry, the text data may be provided to the chat management logic for selection of a "live" (human) operator to intervene in the chat communication session to offer assistance in interpreting the prior text entry into the text field and auto-selecting the corresponding interactive response before returning control back to the chat engine to continue execution of the selected script. As an optional feature, the chat management logic may conduct a secondary chat exchange that is directed to interpreting a prior text entry, and if successful, returning control back to the chat engine to continue execution of the selected script.

As described above, the chat engine is automated under control of the script and remains automated as long as the chat participant continues to answer chat questions in accordance with one of the chat execution paths. In other words, based on the answers provided to the chat questions produced by the script, the chat engine continues to generate subsequent chat questions in accordance with a prescribed chat execution path. Upon completion of the chat execution path, the online interactive form represented by the script also has been completed and the stored information, which pertains to answers to the chat questions during the chat communication session, is forwarded to a targeted provider.

However, if at any time during the chat communication session, the chat participant provides one or more answers that are inconsistent with the line of chat questions associated with a chat execution path and cannot be interpreted by chat monitoring logic or the chat participant requests a "live" operator, the chat assistance logic may notify the chat management logic to connect an available operator to the current chat communication session. Thereafter, the operator can communicate in real-time with the chat participant via the chat window in efforts to collect data associated with a chat question (or auto-select one of the interactive responses to a particular chat question) and return the chat participant back to answering the series of chat questions produced by the automated chat engine in accordance with the chat execution path. This allows the chat participant to request clarification on questions by a human operator at any time, and after such clarification, return back to the automated process. As an alternative, as described above, prior to the chat management logic facilitating intervention by the "live" operator, it is contemplated that the chat management logic may attempt to interpret the answer provided by the chat participant through a secondary question/answer series that is not tailored in accordance with the selected script that may be coded for data gathering.

Furthermore, given that the presence of selectable response elements as well as free-form chat capabilities, the network device deploying the semi-automated chat service may experience increased accuracy in data capture and the captured data may be highly correlated to requisite information associated with an online, interactive form for the targeted provider. The increased accuracy benefits both the targeted provider (receives data for contacting the chat participant after termination of the chat communication session that is typically more reliable than data captured through keyed user input) and the chat participant (avoids repetitive question/answer sessions). Additionally, the semi-automated chat service reduces the overall per chat cost since many businesses that cannot afford typical free-form chat on their own websites, but desire such functionality.

I. Terminology

In the following description, certain terminology is used to describe features of the invention. For example, in certain situations, the terms "logic" and "engine" are representative of hardware, firmware and/or software that is configured to perform one or more functions. As hardware, logic (or engine) may include circuitry having data processing or storage functionality. Examples of such circuitry may include, but are not limited or restricted to a hardware processor (e.g., microprocessor with one or more processor cores, a digital signal processor, a programmable gate array, a microcontroller, an application specific integrated circuit "ASIC", etc.), a semiconductor memory, or combinatorial elements.

Alternatively, the logic (or engine) may be software, such as executable code in the form of an executable application, an Application Programming Interface (API), a subroutine, a function, a procedure, an applet, a servlet, a routine, source code, object code, a shared library/dynamic load library, or one or more instructions. The software, when executed, performs certain functionality. The software may be stored in any type of a suitable non-transitory storage medium, or transitory storage medium (e.g., electrical, optical, acoustical or other form of propagated signals such as carrier waves, infrared signals, or digital signals). Examples of non-transitory storage medium may include, but are not limited or restricted to a programmable circuit; semiconductor memory; non-persistent storage such as volatile memory (e.g., any type of random access memory "RAM"); or persistent storage such as non-volatile memory (e.g., read-only memory "ROM", power-backed RAM, flash memory, phase-change memory, etc.), a solid-state drive, hard disk drive, an optical disc drive, or a portable memory device. As firmware, the executable code may be stored in persistent storage.

The term "network device" should be construed as electronics with the data processing capability along with hardware (e.g., connectors, wireless chipsets including antennas) for connecting to any type of network, such as a public network (e.g., Internet) or a cellular network, a private network (e.g., a wireless data telecommunication network, a local area network "LAN", etc.), or a combination of networks. Examples of a network device may include, but are not limited or restricted to, the following: a server, an endpoint device (e.g., a laptop, a smartphone, a tablet, a desktop computer, a netbook, a medical device, or any general-purpose or special-purpose, user-controlled electronic device); a mainframe; a router; or the like.

A "message" generally refers to information transmitted in one or more electrical signals that collectively include electrically storable data in a prescribed format. Each message may be in the form of one or more packets, frames, an HTTP-based transmission, or any other series of bits having the prescribed format.

The term "computerized" generally represents that any corresponding operations are conducted by hardware in combination with software and/or firmware.

Lastly, the terms "or" and "and/or" as used herein are to be interpreted as inclusive or meaning any one or any combination. Therefore, "A, B or C" or "A, B and/or C" mean "any of the following: A; B; C; A and B; A and C; B and C; A, B and C." An exception to this definition will occur only when a combination of elements, functions, steps or acts are in some way inherently mutually exclusive.

II. General Architecture

Figure 1:
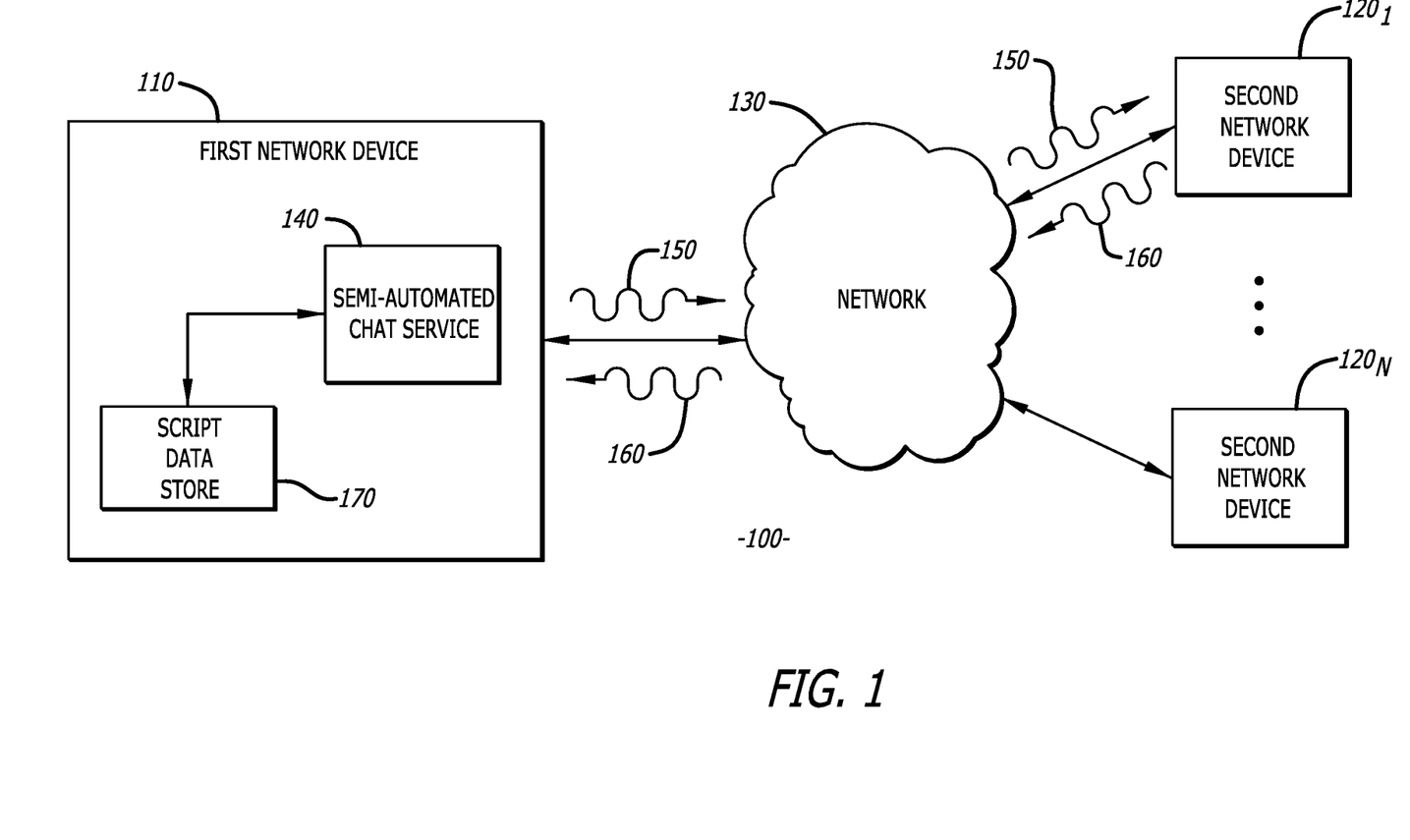
FIG. 1 is an illustrative embodiment of an exemplary semi-automated chat service system providing a standardized set of response elements in communications between the chat server and a chat participant.

Referring to FIG. 1, an exemplary block diagram of a communication system 100 supporting a semi-automated chat service is shown. Herein, the communication system 100 includes a first network device 110 that is communicatively coupled with one or more second network devices $120_1$-$120_N$ (N≥1) via a network 130. The network 130 may be a single network (e.g., public network or private network) or a collection of networks, such as a public network operating in cooperation with a private network (e.g., an organization or enterprise network) for example.

Operating as a web (chat) server by hosting a website that is accessible by the second network devices $120_1$-$120_N$, the first network device 110 includes a semi-automated chat service 140 that monitors navigation activities by network devices (e.g., second network device $120_1$) accessing the website. In response to detecting a certain navigation activity or navigation tendencies, the semi-automated chat service 140 transmits a chat invitation message 150 to the second network device $120_1$. The chat invitation message 150 invites the chat participant in control of the second network device $120_1$ to establish a chat communication session with the semi-automated chat service 140.

According to one embodiment of the disclosure, the chat invitation message 150 may cause a browser application running on the second network device $120_1$ to open a chat (new browser) window that includes a selectable image and/or a field for text entry. Upon return of a chat acceptance message 160 to the semi-automated chat service 140, a bidirectional, chat communication session is established. The chat acceptance message 160 may be returned in response to an activity performed by the chat participant, such as selecting an image within the chat window, entering data within an initial text field of the chat window, or the like. Alternatively, it is contemplated that the chat communication session may be established without any activity performed by the chat participant, as the session may be established upon transmission of the chat invitation message 150 and receipt of the message 150 by the second network device $120_1$.

Figure 4A:
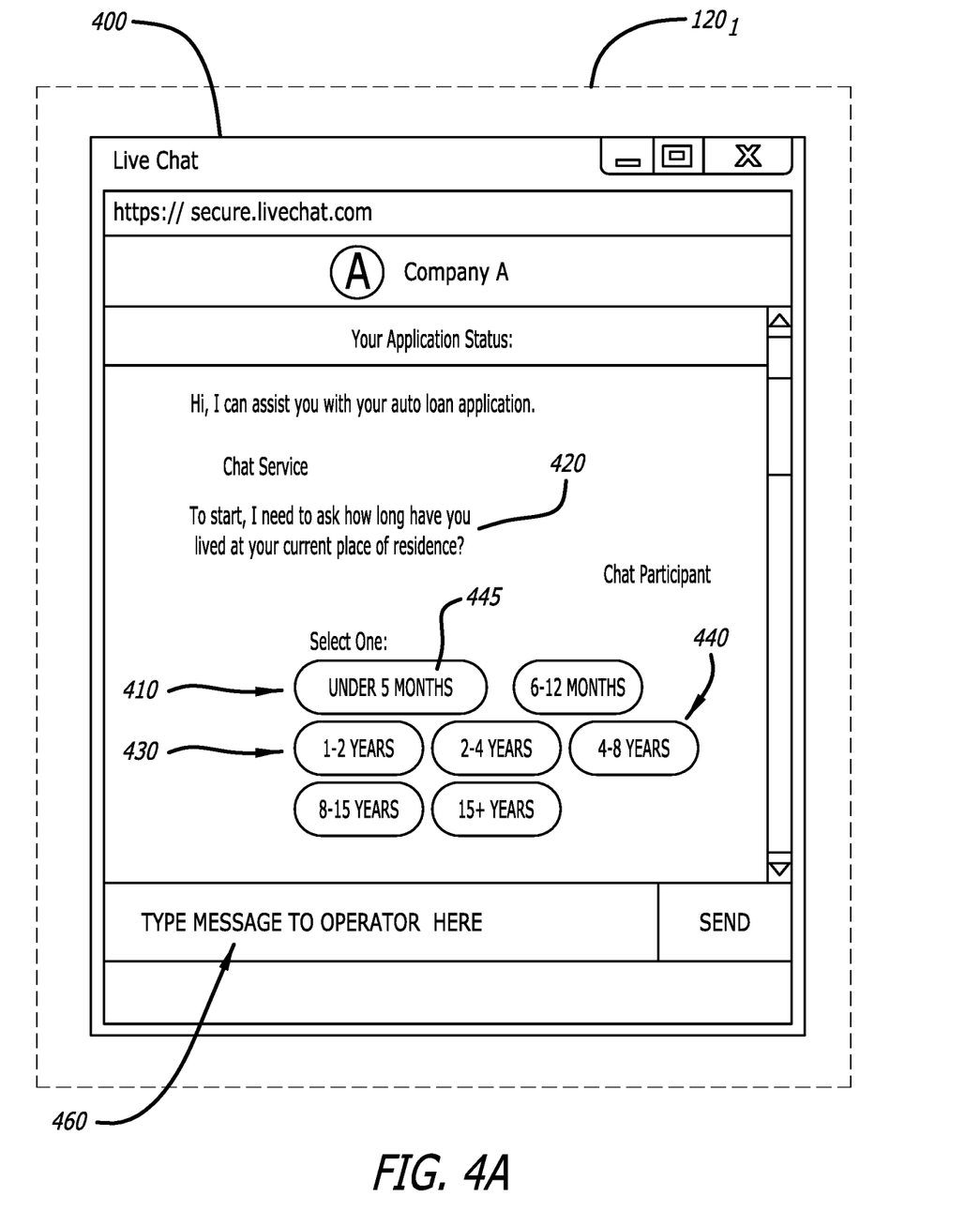
FIGS. 4A-4B are illustrative embodiments of a display screens of the second network device communicatively coupled to the web chat assistance logic of FIG. 2 that generates interactive responses during a chat communication session.
Figure 4B:
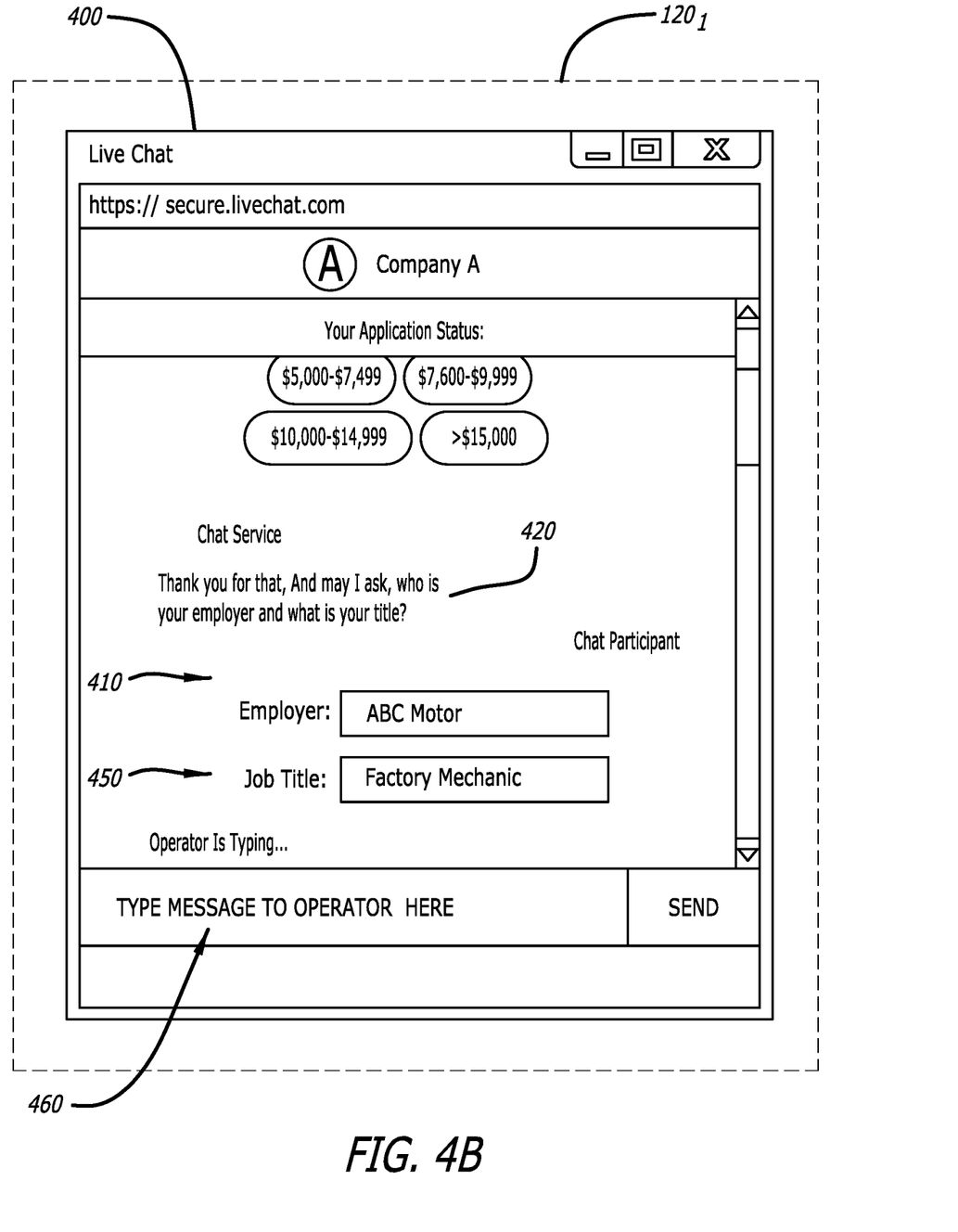

The semi-automated chat service 140 is configured to parse data included as part of the chat acceptance message 160 and interpret the data to select a script from a script data store 170 for use in controlling subsequent communications with the second network device $120_1$ during the chat communication session. The script automates the type and order of chat questions produced by the semi-automated chat service 140 during the chat communication session as well as the type and/or format of interactive responses (e.g., selectable response elements, text field, etc.) that accompany some or all of these chat questions, as shown in FIGS. 4A-4B for illustrative purposes. Additionally, the script may be configured to provide for display in the chat window a dedicated, fillable field for text entry, which allows the chat participant to interact in a free-form manner with a "live" operator.

Figure 2:
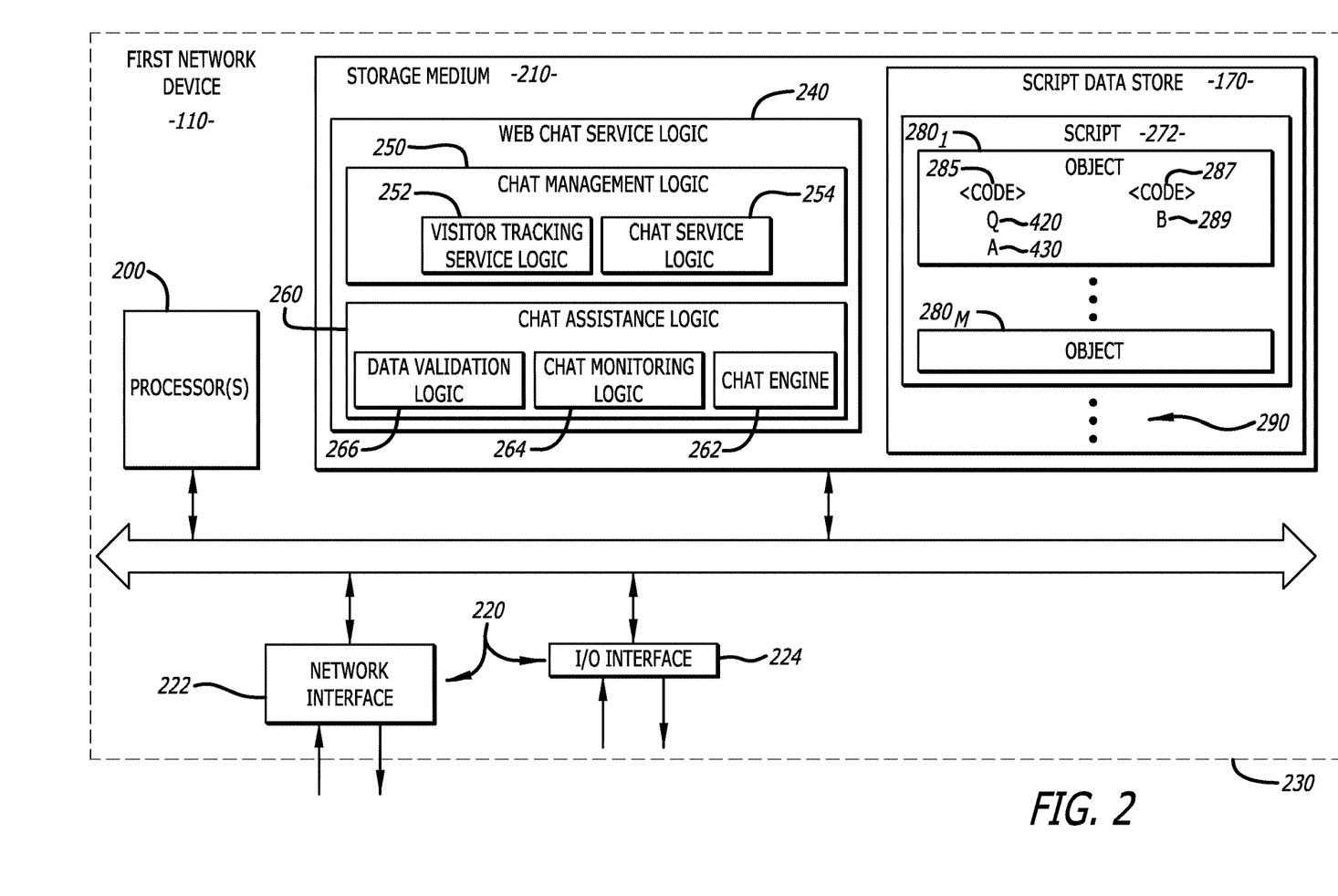
FIG. 2 is an illustrative embodiment of the first network device of FIG. 1 implemented with the semi-automated chat service.

Referring now to FIG. 2, an illustrative embodiment of the first network device 110 operating as a chat server is shown. According to this embodiment of the disclosure, the first network device 110 comprises one or more hardware processors 200 (referred to as "processor(s)"), a non-transitory storage medium 210, and one or more device interfaces 220 (referred to as "device interface(s)"). For instance, the device interface(s) 220 may include a network interface 222, which supports connectivity to the network 130 of FIG. 1. The device interface(s) 220 may further include an input/output (I/O) interface 224 that supports connectivity to a peripheral communicatively coupled to the first network device 110. These components may be at least partially encased in a housing 230, which may be made entirely or partially of a rigid material (e.g., hard plastic, metal, glass, composites, or any combination thereof) that protects these components from environmental conditions.

The processor(s) 200 is a multi-purpose, processing component that is configured to perform the semi-automated chat services upon executing web chat service logic 240 maintained within the non-transitory storage medium 210 operating as a data store. Herein, one example of processor(s) 200 include an Intel® central processing unit (CPU) with an x86-based instruction set architecture. Alternatively, processor(s) 200 may include another type of CPU, a digital signal processor (DSP), an Application Specific Integrated Circuit (ASIC), a field-programmable gate array (FPGA), or any other hardware component with data processing capability.

As described in detail below, the web chat service logic 240 include (i) chat management logic 250 and (ii) chat assistance logic 260. The chat management logic 250 includes visitor tracking service logic 252 and chat service logic 254. The chat assistance logic 260 includes a chat engine 262, chat monitoring logic 264 and data validation logic 266. Although illustrated as software modules to be executed by processor(s) 200, one or more portions of the chat management logic 250 and the chat assistance logic 260 may include hardware deployed within the first network device 110.

Figure 3:
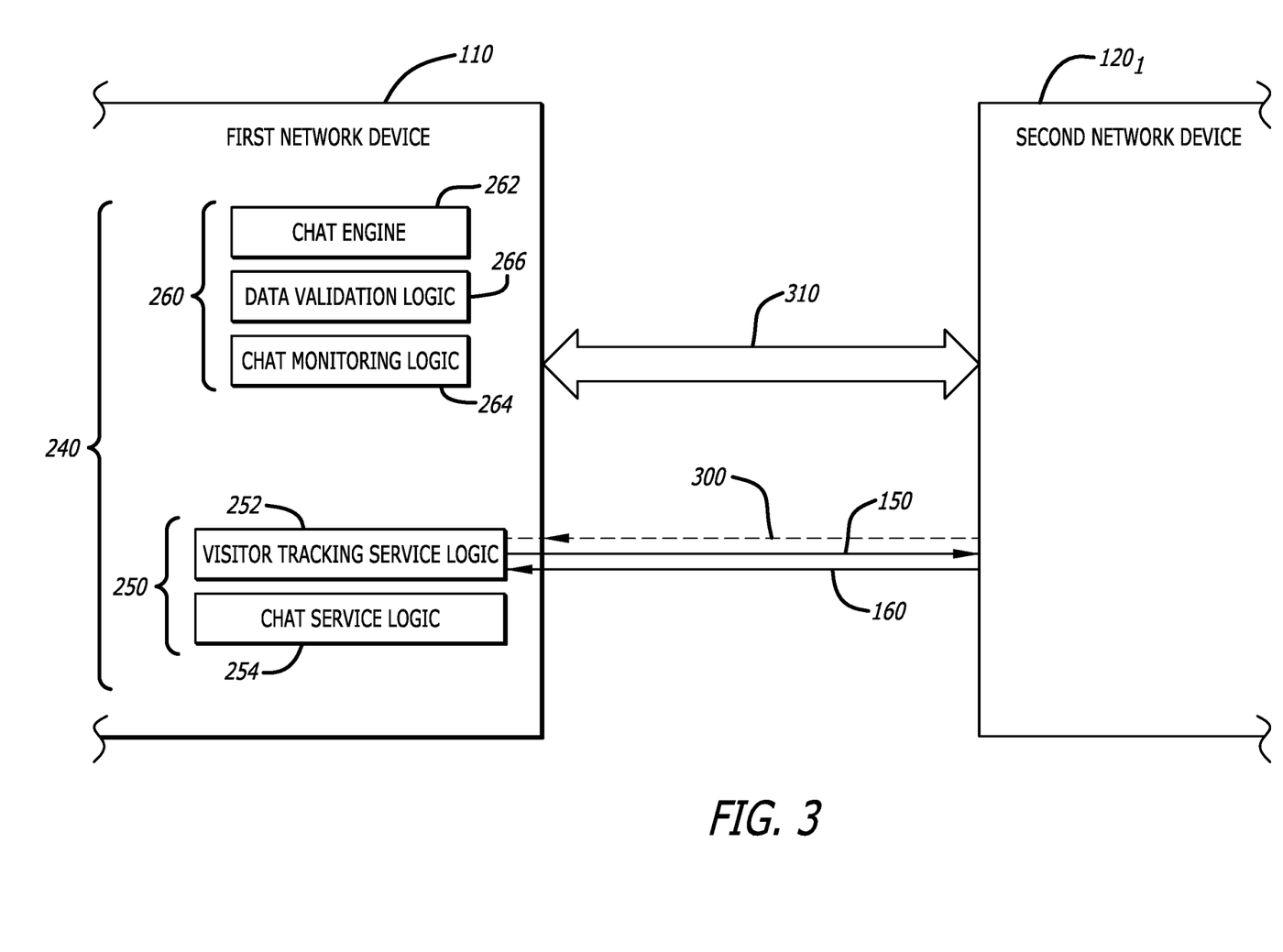
FIG. 3 is an illustrative embodiment of a logical representation of the web chat service logic of FIG. 2 that collectively operate as the semi-automated chat service of FIG. 1.

Referring now to FIG. 3, a logical representation of the web chat service logic 240, operating as a semi-automated chat service hosted by the first network device 110 is shown. According to one embodiment of the disclosure, the visitor tracking service logic 252 of the chat management logic 250 is configured to monitor navigation activities 300 by an online visitor operating the second network device $120_1$. In response to detecting a certain navigation activity, the visitor tracking service logic 252 transmits the chat invitation message 150 to the second network device $120_1$. The detected navigation activity may correspond to a particular event (e.g., selecting a particular image with an embedded link, selecting a pull-down menu on the website, particular movement of the mouse pointer, etc.) or a specific pattern of events (e.g., a particular navigation pattern on the website that is conducted by the second network device $120_1$, continuous connectivity to the website for more than a prescribed duration, etc.).

Besides being responsible for coordinating a transmission of the chat invitation message 150 to the second network device $120_1$, the visitor tracking service logic 252 is also responsible for monitoring receipt of the chat acceptance message 160 that establishes a chat communication session 310 between the first network device 110 and the second network device $120_1$. After the chat communication session 310 is established, the chat assistance logic 260 is responsible for controlling communications between the first network device 110 and the second network device $120_1$.

Furthermore, operating in concert with the chat assistance logic 260, the chat service logic 254 may be configured to conduct a secondary analysis on data received by the chat assistance logic 260 during the chat communication session 310 when the chat monitoring logic 264 being unable to interpret such data. Alternatively, or in addition to the secondary analysis, the chat service logic 254 may coordinate intervention by a "live" operator 320 into the chat communication session 310 in response to a certain activity being detected by the chat assistance logic 260. Examples of such activity may include, but is not limited or restricted to (i) a chat question answered by text entered into the dedicated fillable field in the chat window that cannot be interpreted by the chat monitoring logic 264, (ii) receipt of inconsistent data detected by the chat monitoring logic 264 after aggregating data from the answers to the interactive responses, and/or (iii) selection of a particular interactive response (e.g., an "other" selectable response element) that may initiate communications to a "live" operator for assistance. The "live" operator 320 may be selected by the chat service logic 254 based on a number of parameters being monitored by the chat management logic 250. These parameters may include, but are not limited or restricted to the following: estimated wait time until the operator is available, geographic proximity to the chat participant, category for the query, experience level needed to address the query, or the like.

Referring still to FIG. 3, the chat assistance logic 260 includes a scriptable, automated chat engine 262 that is configured to generate chat content in accordance with one or more scripts 270 (e.g., a first script 272). Each of the scripts 270 may correspond to a targeted provider or a targeted industry. The scripts 270 may be preloaded into the non-transitory storage medium 210 and updated in a periodic or aperiodic manner.

The chat assistance logic 260 further includes chat monitoring logic 264 that monitors progress of the chat communication session to detect activity that may require "live" operator intervention (e.g., a dedicated fillable field that is separate from the interactive responses is used by the chat participant in response to one of the chat questions and/or data entered into the dedicated fillable field cannot be associated with one of the selectable response elements).

More specifically, as illustrated in FIGS. 2-4B, when operating in accordance with the first script 272, the chat engine 262 generates chat content 410 for transmission from the first network device 110 for display within a chat window 400 at the second network device $120i$. The chat content 410 includes a chat question 420 along with one or more interactive responses 430, which may include (i) one or more selectable response elements 440 (e.g., one or more selectable standardized input such as selectable display buttons, drop-down menus, etc.) as shown in FIG. 4A and/or (ii) one or more text fields 450 for the chat participant to interact in a free-form manner as shown in FIG. 4B.

According to one embodiment of the disclosure, the first script 272 includes an array of objects $280_1$-$280_M$ (M≥2) that collectively formulate a decision tree having multiple chat execution paths. Each object $280_1$-$280_M$ of the first script 272 (e.g., object $280_1$) includes code 285 that, upon execution in accordance with a plurality of rules (that may be configured to control processing ordering of the objects; set a threshold amount of objects needed to be processed before chat communication session can discontinue upon detecting a level of frustrating growing in the chat participant as measured by delays in receiving answers, text entries in the fillable text field 460 concerning the chat duration or number of chat questions remaining; etc.), displays the chat question (Q) 420 followed by the plurality of interactive responses (A) 430, as described below. The object $280_1$ further includes code 287 that, upon transmission of the chat question 420 and interactive responses 430, controls behavior 289 of the chat engine 262 by selecting a next chat question (or series of chat questions) along the chat execution path based on the selected interactive response. The first script 272 may be provided as a JavaScript Object Notation (JSON) object.

According to one embodiment of the disclosure, each of the objects $280_1$-$280_N$ within the first script 272 stored in storage medium 210 is configured with chat questions 420 and interactive responses 430 that solicit answers to complete an interactive form that is integrated as part of the first script 272. When selectable response elements 440 are being used by the chat participant, the particular selected response element 445 is highlighted and remains in a chat window 400 displayed by the second network device $120_1$, as shown in FIG. 4A.

Additionally, or in the alternative to providing selectable responses as shown in FIG. 4B, the chat engine 262 may generate one or more text boxes 450, which may prompt the chat participant to enter personal identifiable information as an answer to a particular question (e.g., contact information, mailing address, employment information such as employer, occupation, years at employer, credit or membership card numbers, etc.). The chat assistance logic 260 may include the data validation logic 266 that confirms the answers set forth in the text box 450 are compliant with the type of personal identifiable information requested.

As illustrative examples, the data validation logic 266 may confirm that, where the text field box is intended to receive a zip code, a five digit number is entered. Similar, as another illustrative example, where the text box 450 is intended to receive a telephone number, the data validation logic may confirm that ten numerals are entered and certain prefixes (e.g., "555" in the United States) are not entered. Alternatively, where the text box 450 is intended to receive a certain type of character string (e.g., first/last name, city, etc.), no numbers or punctuation are included as part of the character strings. Hence, the data validation logic 266 prevents or at least mitigates data entry errors.

The chat assistance logic 260 is automated so that, in accordance with the scripts 270, remains automated by continuing transmission of chat questions 420 and their corresponding interactive responses 430 as long as the chat participant continues to answer questions in accordance with one of the chat execution paths set forth by scripts 270. In other words, based on the answers provided to the chat questions 420 produced by the scripts 270 (e.g., first script 272), the chat assistance logic 260 continues to generate and provide subsequent chat questions 420 that formulate a chat execution path until the chat execution path has completed. Once the chat execution path has completed, the interactive form represented by the first script 272 has been answered and the stored information 290, which pertains to answers for the chat questions included in the first script 272, is forwarded to a targeted recipient.

Additionally, if the chat participant provides answers that are inconsistent with the current question along the chat execution path or a "live" (human) operator is requested (e.g., fillable text field 460 is used by the chat participant), the chat assistance logic 260 may notify the chat management logic 250 to connect an available "live" operator to the current chat communication session. Thereafter, the "live" operator can communicate in real-time with the chat participant via the chat window 400 to collect data associated with a chat question (or auto-select one or more interactive responses to a particular chat question) before returning the chat participant to a chat execution path provided by the first script 272. This allows the chat participant with a capability of requesting clarification on questions at any time.

Figure 5:
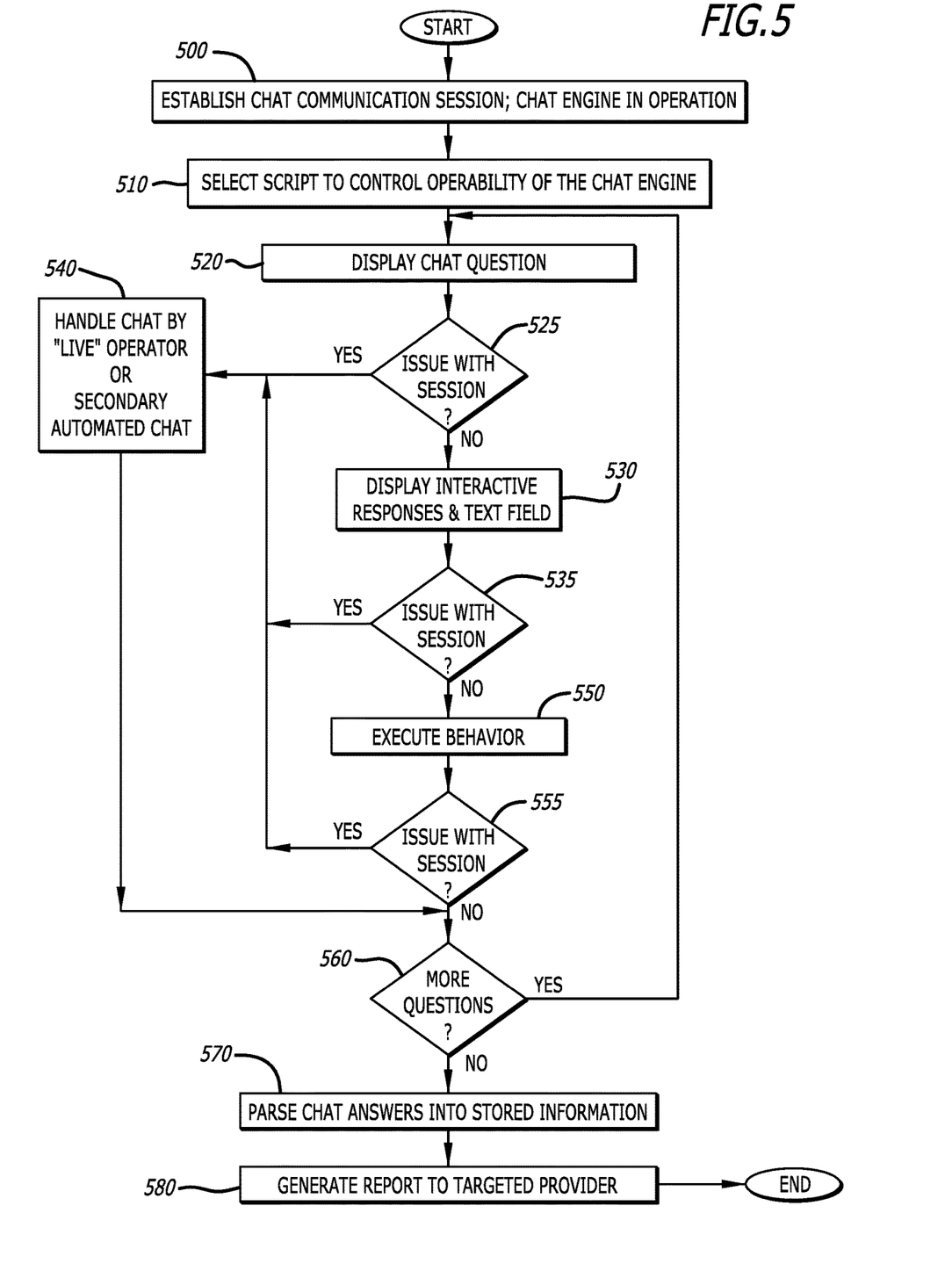
FIG. 5 is an illustrative embodiment of a flowchart identifying representative operations of the chat assistance logic in generating a lead report to a targeted recipient.

Referring now to FIG. 5, an exemplary flowchart of the operations of the semi-automated, chat service 140 of FIGS. 1-3 is shown. Employed as part of the chat assistance logic, the chat engine becomes operable in response to establishing a chat communication session (block 500). Based on the nature of the chat communication session learned by parsing information from an initial chat communication (e.g., chat acceptance message) and interpreting the information, a script is selected to control operability of the chat engine (block 510). The script may be selected from a plurality of scripts, where each script is configured to solicit answers to a set of questions representing an online interactive form, which may be specific to a particular provider or group of providers.

In accordance with the script, the chat engine generates for display successive chat questions along with corresponding interactive responses while the chat monitoring logic within the chat assistance logic monitors for activity that denotes issues associated with the chat communication session (blocks 520-525 and 530-535). Examples of such activity may include, but is not limited or restricted to (a) sending a chat text (or multiple chat texts) in advance of the display of a chat question that may represent growing impatience by the chat participant, (b) sending a chat text answer in lieu of selection of one of the interactive responses, (c) sending chat text answer by the chat participant that is not responsive to a displayed chat question being displayed, or (d) sending chat text answer by the chat participant cannot be interpreted by the chat monitoring logic to correspond to any of the interactive responses provided with the chat question.

It is contemplated that the chat questions may be provided in a static order as outlined by the selected script. Alternatively, the chat questions may be provided dynamically, where the ordering may be based, at least in part, on availability of the "live" operators. For instance, where the wait time is greater than a prescribed threshold, rudimentary chat questions (e.g., name, phone number, etc.) may be generated for display while chat questions of a more personal nature, which are more likely to trigger a request for a "live" operation (e.g., based on heuristics), are delayed as the "live" operators work to reduce the wait time.

In response to an issue with the chat communication session, the chat monitoring logic may signal the chat service logic within the chat management logic to select a "live" operator to join and temporarily control the chat communication session (block 540). It is contemplated that the selection of the "live" operator may be based on a plurality of parameters, including a workload level of the operators, an expertise of the operator, a language spoken by the operator, or the like.

Besides monitoring the chat questions and the answers to the chat questions, the chat monitoring logic further monitors the behaviors undertaken by the script (blocks 550-555). This monitoring is to ensure that behaviors that are outside the scope of direct interaction with the visitor during a chat communication session are consistent with expected behaviors. For example, displaying and updating a status bar that indicates the progress of the chat is monitored to ensure accuracy of such display and updates. Also, verifying data such as a phone number against an external database to ensure validity may pertain to the behavioral monitoring.

The data gathering process continues until all of the chat questions associated with the selected script (or a lesser but acceptable number based on activity by the chat participant) have been answered (block 560). After completion, information associated with the answers are parsed and placed into a prescribed format for transmission to a targeted provider (blocks 570 and 580).

What is claimed is:

1. A non-transitory storage medium, including software for execution by one or more hardware processors deployed within a network device, comprising:

chat management logic that, when executed by the one or more hardware processors, monitors navigation activities being conducted on a website associated with the network device and commences to establish a chat communication session with a second network device upon detecting a certain navigation activity;

chat assistance logic includes a chat engine that generates content associated with the chat communication session in accordance with a script executed by the chat engine, the chat engine, when executed by the one or more hardware processors, generates content associated with the chat communication session for display to a user, the content includes (i) a chat question, (ii) one or more interactive responses to the chat question that, upon selection, returns a predetermined answer to the chat question for processing by the chat engine, and (iii) a text field, wherein the chat assistance logic further includes (a) a chat validation logic to confirm that text data entered into the text field is compliant with a type of information requested and (b) a chat monitoring logic that attempts to interpret the text data entered into and displayed within the text field as a response to the chat question and is configured to (i) provide the text data to the chat management logic for selection of an operator to intervene in the chat communication session when the chat monitoring logic is unable to interpret the text data, and (ii) automatically select an interactive response of the one or more interactive responses as a representative response to the chat question in lieu of providing the text data to the chat engine for processing when the chat monitoring logic is able to interpret the text data as corresponding to the interactive response, wherein the interactive response is generated by the chat engine and displayed concurrently with the text field prior to entry of the text data within the text field by the user.

2. The non-transitory storage medium of claim 1, wherein the chat management logic includes visitor tracking service logic that, when executed, monitors the navigation activities being conducted on the website hosted by the network device and transmits a chat invitation message in response to detecting the certain navigation activity.

3. The non-transitory storage medium of claim 2, wherein the certain navigation activity corresponds to at least a particular pattern of navigation activity on the website by the network device.

4. The non-transitory storage medium of claim 2, wherein the chat assistance logic comprises the chat engine that generates the content associated with the chat communication session in accordance with the script executed by the chat engine, the script being configured to correspond to either an industry or a provider pertaining to the website.

5. The non-transitory storage medium of claim 2, wherein the chat assistance logic comprises a chat monitoring logic that (i) monitors a progress of the chat communication session, and (ii) continues to generate a subsequent chat question along with interactive responses corresponding to the subsequent chat question, the interactive responses include one or more selectable response elements.

6. The non-transitory storage medium of claim 5, wherein each of the one or more selectable response elements corresponds to a selectable display button.

7. The non-transitory storage medium of claim 5, wherein the chat management logic further includes chat service logic that, when executed, conducts a secondary analysis on data received by the chat assistance logic during the chat communication session when the chat monitoring logic being unable to interpret data entered into the one or more interactive responses.

8. The non-transitory storage medium of claim 1, wherein when the chat monitoring logic is unable to interpret the text data entered into the text field to automatically select the interactive response, the chat management logic is configured to provide an operator with access to the chat communication session for interpretation and selection of the interaction response before control is returned back to the chat management logic.

9. The non-transitory storage medium of claim 1, wherein the chat assistance logic generates the chat question, the one or more interactive responses to the chat question, and the text field to be displayed simultaneously on a display screen.

10. The non-transitory storage medium of claim 1, wherein the chat question is selected for display based on results of a comparison of an expected wait time to a prescribed threshold, wherein the expected wait time corresponds to availability of a human operator.

11. A computerized method comprising:
establishing a chat communication session by a first network device with a second network device;
generating, by a chat engine, displayable content during the chat communication session for transmission by the first network device, the displayable content includes (i) a first chat question, (ii) a first set of interactive responses to the first chat question that, upon selection of a first interactive response, returns a predetermined answer to the chat engine for processing, and (iii) a first text field;
transmitting the displayable content by the first network device to the second network device;
responsive to detecting a selection of a first interactive response of the first set of interactive responses at the second network device, generating at least a second chat question and a second set of interactive responses to the second chat question for transmission by the first network device to the second network device, wherein the first chat question is selected for display based on results of a comparison of an expected wait time to a prescribed threshold, wherein the expected wait time corresponds to availability of a human operator;
responsive to detecting text entry entered into and displayed within the first text field, confirming that text data associated with the text entry is compliant with a type of information requested and, if so, attempting to interpret the text data entered into the first text field as a response to the second chat question;
selecting the human operator to intervene in the chat communication session in response to an inability of interpreting the text data entered into and displayed within the first text field; and
automatically selecting an interactive response of the second set of interactive responses, generated by the chat engine and displayed concurrently with the first text field prior to entry of the text data within the text field by the user, as a representative response to the second chat question in lieu of providing the text data to the chat engine for processing in response to interpreting the text data entered into and displayed within the first text field as corresponding to the interactive response.

12. The computerized method of claim 11, wherein prior to establishing the chat communication session, the method further comprising:
monitoring navigation activities being conducted on a website hosted by the first network device; and
commencing to establish the chat communication session with the second network device upon detecting a certain navigation activity.

13. The computerized method of claim 12, wherein the navigation activities correspond to selection of an image or menu on the website hosted by the first network device.

14. The computerized method of claim 12, wherein the navigation activities correspond to a pattern of navigation activities on the website by the second network device.

15. The computerized method of claim 14, wherein the displayable content associated with the chat communication session is generated in accordance with a script executed by the chat engine within the first network device, the script includes a plurality of rules that are configured to complete questions within an interactive form and chat monitoring logic, upon interpreting the text data within the first text field and substituting the interactive response for a return of the text data, returns control back to the chat engine.

16. The computerized method of claim 11, wherein each of the first set of interactive responses includes a selectable response element corresponding to a selectable display button.

17. The computerized method of claim 11, wherein responsive to detecting the text entry within the first text field and failing to interpret the text entry as one of the first set of interactive responses, provider the operator with access to the chat communication session.

18. A first network device comprising:
one or more hardware processors; and
a memory communicatively coupled to the one or more hardware processors, the memory comprises
chat management logic that, when executed by the one or more hardware processors, monitors navigation activities being conducted on a website associated with the network device and commences to establish a chat communication session with a second network device upon detecting a certain navigation activity, and
chat assistance logic includes a chat engine that generates content associated with the chat communication session in accordance with a script executed by the chat engine, the chat engine, when executed by the one or more hardware processors, generates content associated with the chat communication session for display to a user, the content includes (i) a chat question, (ii) one or more interactive responses to the chat question that, upon selection, returns a predetermined answer to the chat question for processing by the chat engine, and (iii) a text field, wherein the chat assistance logic further includes (a) a chat validation logic to confirm that text data entered into the text field is compliant with a type of information requested and (b) a chat monitoring logic that attempts to interpret the text data entered into and displayed within the text field as a response to the chat question and is configured to (i) provide the text data to the chat management logic for selection of an operator to intervene in the chat communication session when the chat monitoring logic is unable to interpret the text data, and (ii) automatically select an interactive response of the one or more interactive responses, generated by the chat engine and displayed concurrently with the text field prior to entry of the text data within the text field by the user, as a representative response to the chat question in lieu of providing the text data to the chat engine for processing when the chat monitoring logic is able to interpret the text data as corresponding to the interactive response.

19. The first network device of claim 18, wherein the chat management logic includes visitor tracking service logic that, when executed by the one or more hardware processors, monitors the navigation activities being conducted on the website hosted by the network device and transmits a chat invitation message in response to detecting the certain navigation activity.

20. The first network device of claim 18, wherein the certain navigation activity corresponds to at least a pattern of navigation activity on the website by the first network device.

21. The first network device of claim 18, wherein the chat assistance logic generates the chat question, the one or more interactive responses to the chat question, and the text field to be displayed simultaneously during the chat communication session.

* * * * *